United States Patent [19]
Chung et al.

[11] Patent Number: 4,795,109
[45] Date of Patent: Jan. 3, 1989

[54] TAPE CASSETTE LOADING DEVICE

[75] Inventors: Hyun T Chung, Seoul; Sung C. Hong, Suwon, both of Rep. of Korea

[73] Assignee: Gold Star Co., Ltd., Seoul, Rep. of Korea

[21] Appl. No.: 2,433

[22] Filed: Dec. 23, 1986

[30] Foreign Application Priority Data

| Dec. 23, 1985 | [KR] | Rep. of Korea | 17401[U] |
| Dec. 24, 1985 | [KR] | Rep. of Korea | 17487[U] |
| Dec. 24, 1985 | [KR] | Rep. of Korea | 17505[U] |

[51] Int. Cl.⁴ .......................................... G11B 15/66
[52] U.S. Cl. .................................. 242/198; 360/96.5
[58] Field of Search .............................. 242/197–200; 360/93, 96.1, 96.5, 85, 96.6

[56] References Cited

U.S. PATENT DOCUMENTS

| 3,936,011 | 2/1976 | Staar | 360/96.5 X |
| 4,107,753 | 8/1978 | Izumikawa | 360/93 X |
| 4,583,138 | 4/1986 | Imazaike | 360/96.5 X |
| 4,628,382 | 12/1986 | Okumura | 360/96.5 X |
| 4,685,009 | 8/1987 | Min et al. | 360/96.5 X |
| 4,689,701 | 8/1987 | Isaki et al. | 360/96.5 X |

Primary Examiner—David Werner
Attorney, Agent, or Firm—Birch, Stewart, Kolasch & Birch

[57] ABSTRACT

A tape cassette loading device comprising a housing, brackets, a cassette holder having a pin, levers having a recess and a gear member, and V-shaped driving member defining two arms wherein one is an arcuate shaped gearing surface and the other extends to form a door, whereby, upon closing the door, the cassette holder is transferred from a cassette take-up portion to a cassette operation position.

3 Claims, 5 Drawing Sheets

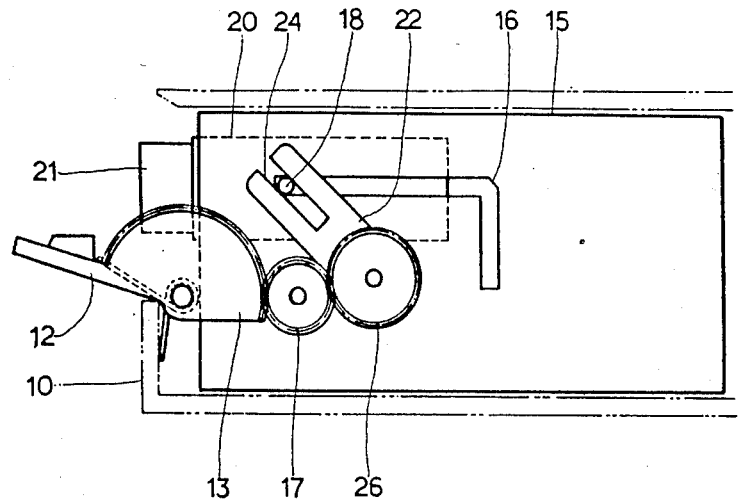
FIG, 1A
PRIOR ART
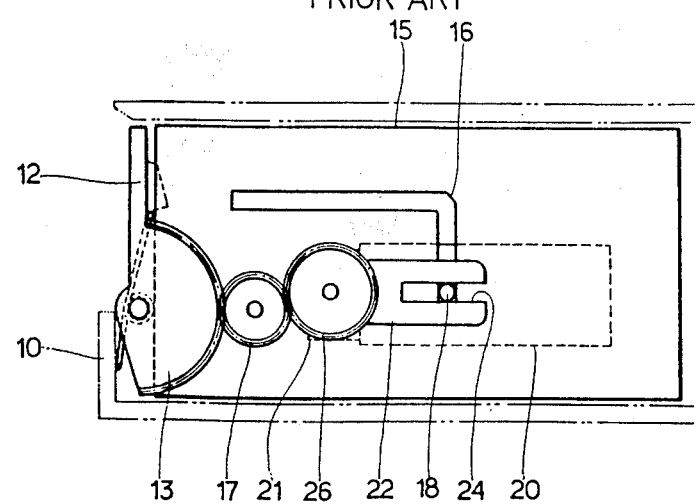
FIG, 1B
PRIOR ART

TAPE CASSETTE LOADING DEVICE

BACKGROUND OF THE INVENTION

The present invention relates to a tape cassette loading device for a cassette type video tape recorder, more particularly to a mechanical cassette loading device which is simple and inexpensive to manufacture.

In a conventional art as shown in FIGS. 1A and 1B, sector gears 13 are provided on both sides of a door 12 for closing an opening formed on the front of a housing 10, and each sector gear 13 is interlocked with an idler gear 17 which is interlocked with an interlocking gear 26 formed on an actuating lever 22 so that the driving force of the sector gear 13 may be transferred to the interlocking gear 26 to locate a tape cassette 21 in a loading position. In such prior art device for a tape cassette, the rotating force of the sector gears 13 attached to the door 12 is transferred to the interlocking gear 26 of the actuating lever 22 through the separate idler gear 17 so as to transfer the rotational force of the door 12 to the interlocking gear 26 in a reverse direction. Therefore, the device is complicated to manufacture.

In another conventional art as shown in FIG. 2A and 2B, when a tape cassette 21 is inserted into a cassette holder 20, and then a motor 13a is automatically rotated by electrical sensing so that a worm gear 17a mounted thereto is rotated in order to rotate a worm wheel 26a interlocked therewith. Thereby, a actuating lever 22 fixed to the worm wheel 26a may be moved along an inverted L-shape guide groove 16 so that the tape cassette 21 is loaded (FIG. 2B). On the contrary, in unloading mode, the motor 13a is reversely rotated with an electric sensing by eject mode so that the worm wheel 26a is rotated in the counterclockwise direction to the unload tape cassette 21. However, since a motor 13a is additionally installed in this prior art, it raises the production expense.

It is therefore an object of this invention to provide a cassette loading device which is simple and inexpensive to manufacture.

BRIEF DESCRIPTION OF THE DRAWINGS

These and other objects, features and advantages of the invention will become more apparent upon a reading of the following detailed description and drawings, in which:

FIGS. 1A and 1B are sectional views of a prior art to which the present invention pertains, showing unloading and loading states, respectively;

BEST MODE OF CARRYING OUT THE INVENTION

Figure 2A:
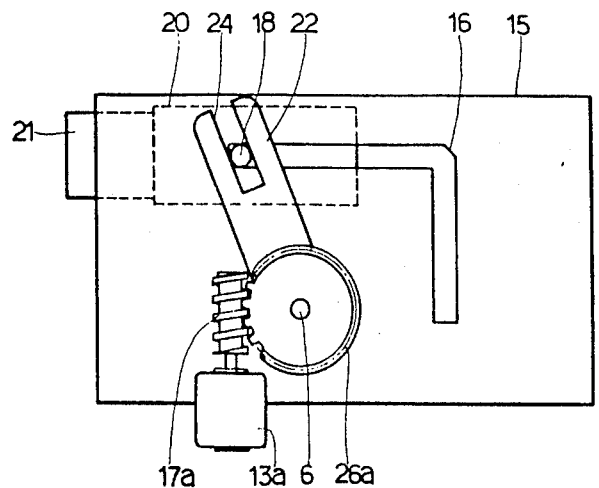
FIGS. 2A and 2B are views of another prior art, similar to those of FIGS. 1A and 1B.
Figure 2B:
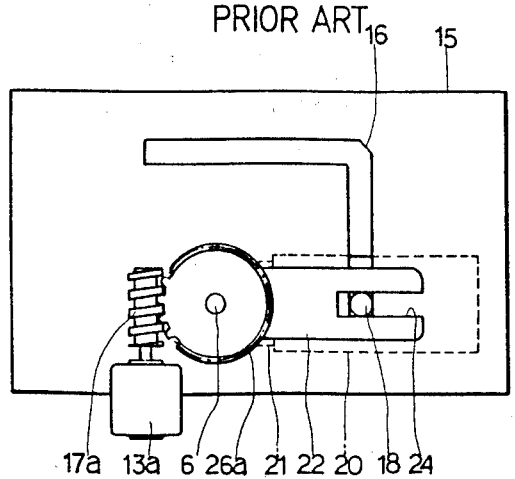
Figure 3A:
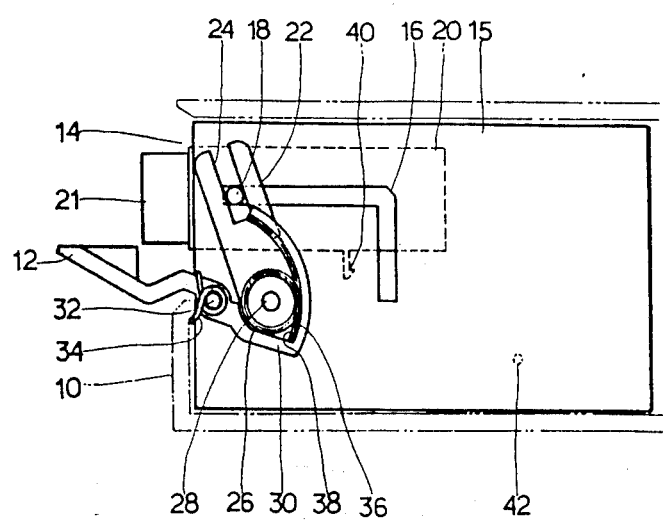
FIGS. 3A and 3B are sectional views of the cassette loading device according to the present invention, showing unloading and loading states, respectively.
Figure 3B:
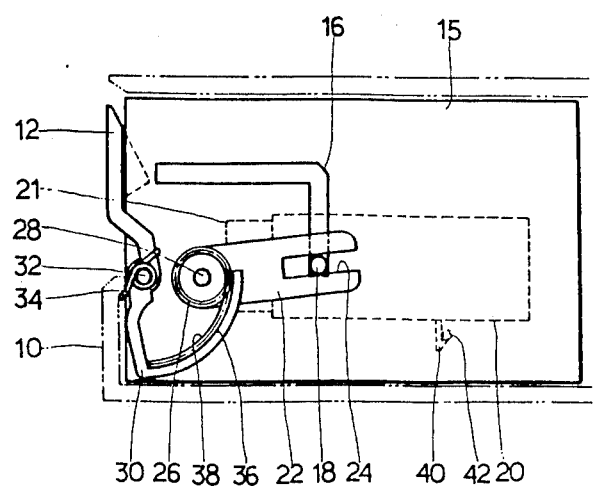

Referring first to FIGS. 3A and 3B, there is shown an embodiment of the cassette loading device of the present invention. A housing 10 is provided with a door 12 for closing an opening 14 formed on the front of the housing 10. The housing 10 further includes bracket 15 formed with at its both sides reversed L-shape guide groove 16 along which a connecting pin 18 of a cassette holder 20 is slidably moved according to an actuating lever 22 connected with the connecting pin 18 being moved. The actuating lever 22 is formed with a recess 24 in which the connecting pin 18 is slidably connected, and is provided with an interlocking gear 26 secured thereto through a coaxial shaft 28. A generally V-shape driving member 30 is interconnected with the door 12 with a pivot pin 32 having a biasing means, for instance a distortion spring 34, for biasing the door 12. The driving member 30 is provided with an arcuate gear portion 36 having teeth 38 along its inner side, which is adapted to interlock with the interlocking gear 26. The reference numeral 40 is a locking element fixed below the cassette holder 20, which is engaged with a locking pin 42 in tape cassette loading mode.

FIG. 3A shows the door is opened, wherein the interlocking gear 26 of the actuating lever 22 is positioned in the deepmost portion of the driving member 30 and the actuating lever 22 is substantially in upright position. When the door 12 is pushed, the interlocking gear 26 of the actuating lever 22 is moved to an edge portion of the arcuate gear portion 36 while interlocking with the teeth 38, and thus the connecting pin 18 of the cassette holder 20 is moved along the groove 16 and is positioned in the lowermost position. Thereby, the locking element 40 is engaged with the locking pin 42 and tape cassette loading is achieved. When an eject lever (not shown) is pushed, the locking pin 42 is moved and disengaged from the locking element 40. Thereby, the cassette holder 20 is restored by the restoring force of the spring 34 and simultaneously the door 12 is opened.

Figure 4A:
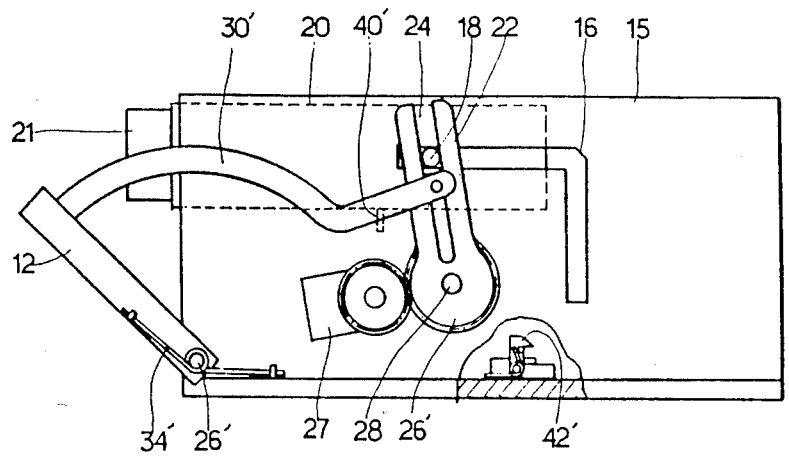
FIGS. 4A and 4B are views of another embodiment according to the present invention, similar to those of FIGS. 3A and 3B.
Figure 4B:
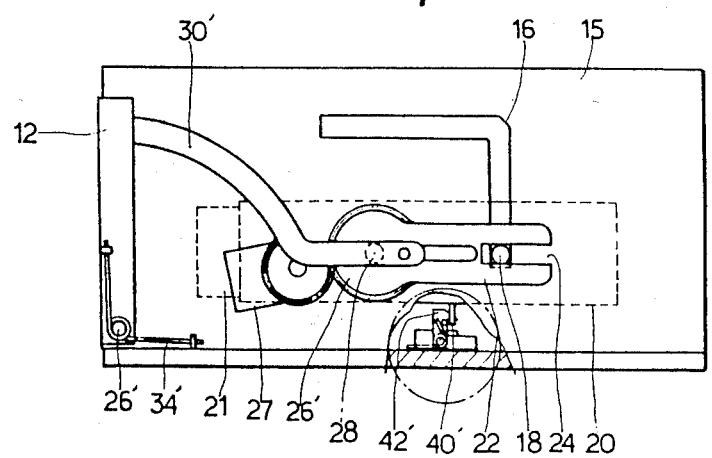
Figure 4C:
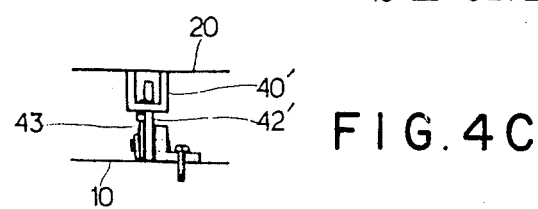
FIG. 4C is an enlarged side elevational view of the encircled portion in FIG. 4B.

Referring to FIGS. 4A, 4B, and 4C, there is shown another embodiment of the present invention. A meandering lever 30' is used as a driving member and the actuating lever 22 is further provided with an additional slot 23 to slidably receive an axial pin 31 fixed to the lever 30'. The reference numeral 26' is an interlocking gear integrally formed with the actuating lever 22, which is interlocked with a separately provided gear 27 so that the connecting pin 18 of the cassette holder 20 may be moved along the groove 16 according to the movement of the door 12. The door 12 is biased by means of a torsion spring 34' fixed to the bracket 15 with a pin 26'.

Accordingly, when the door 12 is pushed, the connecting pin 18 of the cassette holder 20 is moved along the groove 16 so that tape cassette loading is effected. Simultaneously, a hook 40 fixed to the cassette holder 20 is engaged with a locker 42' to oppose against the biasing force of the spring 34'. There is shown a side elevational view of a locking mechanism according to the invention in FIG. 4C to better illustrate the construction of the locking mechanism. The locker 42' is fixed with a screw to the housing 10 along with a torsion spring 43 so that the locker 42' may be resiliently moved during lockage.

On the contrary, in unloading mode, the eject lever 44 is moved and pushes the locker 42' so that the lockage may be released. Accordingly, the pin 18 of the cassette holder 20 may be restored along the groove 16 by the restoring force of the spring 34'.

Figure 5A:
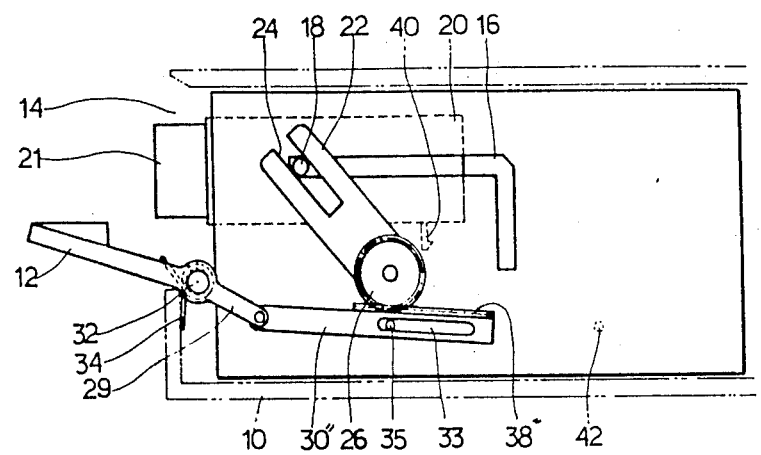
FIGS. 5A and 5B are views of a further embodiment according to the present invention, similar to those of FIGS. 3A and 3B.
Figure 5B:
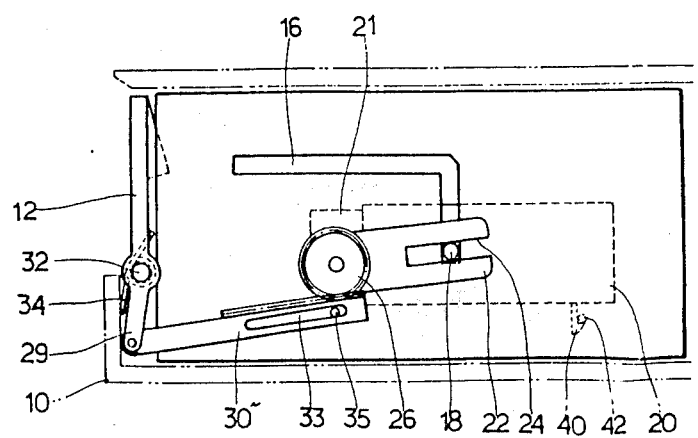

Referring to FIGS. 5A and 5B, there is shown a further embodiment of the present invention. A rack 30" having an extended portion 29 pivotally fixed thereto with a pivot pin 32 serves as a driving member, the extended portion 29 being fixed to the door 12 with an axial pin 32 having a torsion spring 34. The rack 30" is provided with a guide slot 33 adapted to slidably receive a guiding pin 35 fixed to the bracket 15, and is provided with a gear portion 38" to convert the pivotal movement to a linear movement. The gear portion 38" is interlocked with the interlocking gear 26 so that the connecting pin 18 may be moved along the guide groove 16 according to the movement of the door 12. The locking mechanism is similar to that of the first embodiment shown in FIGS. 3A and 3B. In unloading mode, the pin 42 is moved and disengaged from the locking element 40 so that the connecting pin 18 may be restored along the guide groove 16 by the restoring force of the spring 34.

While preferred embodiments of the present invention have been desribed using specific terms, such description is for illustrative purposes only, and it is to be understood that changes and variations may be made without departing from the spirit of scope of the following claims.

What is claimed is:

1. A tape cassette loading device for a cassette type video tape recorder comprising:
   a housing,
   brackets formed on both sides of said housing, said brackets having guiding grooves disposed on both interior sides of said brackets,
   a movable cassette holder adapted to contain a video tape cassette, said movable cassette holder having pins attached thereto which are slidably engaged in said guiding grooves,
   actuating levers operatively associated with said brackets, said actuating levers having a recess disposed at one end thereof for slidably receiving said pin, and gear means disposed at the other end thereof, and
   driving members pivotally mounted on said brackets for engagement with said gear means, said driving members having arms which form a substantially V-shaped configuration, one of said arms defining an arcuate shaped gearing surface for receiving said gear means and the other of said arms extending to form a door member, whereby, upon the closing of the door member, said door member engages the video tape cassette disposed in the movable cassette holder and the gear means rotates to move along the gearing surface of said driving member and said pin moves in said guiding grooves by the action of said actuating levers whereby said actuating levers transfer the cassette holder from a cassette take-up position to a cassette operation position.

2. The tape cassette loading device of claim 1, wherein the driving member is provided with a spring means which biases the door member in the gear position.

3. The tape cassette loading device of claim 2, wherein the cassette holder is provided with a hook member for locking the cassette holder to the housing against the bias of the spring means.

* * * * *